Figure 1:
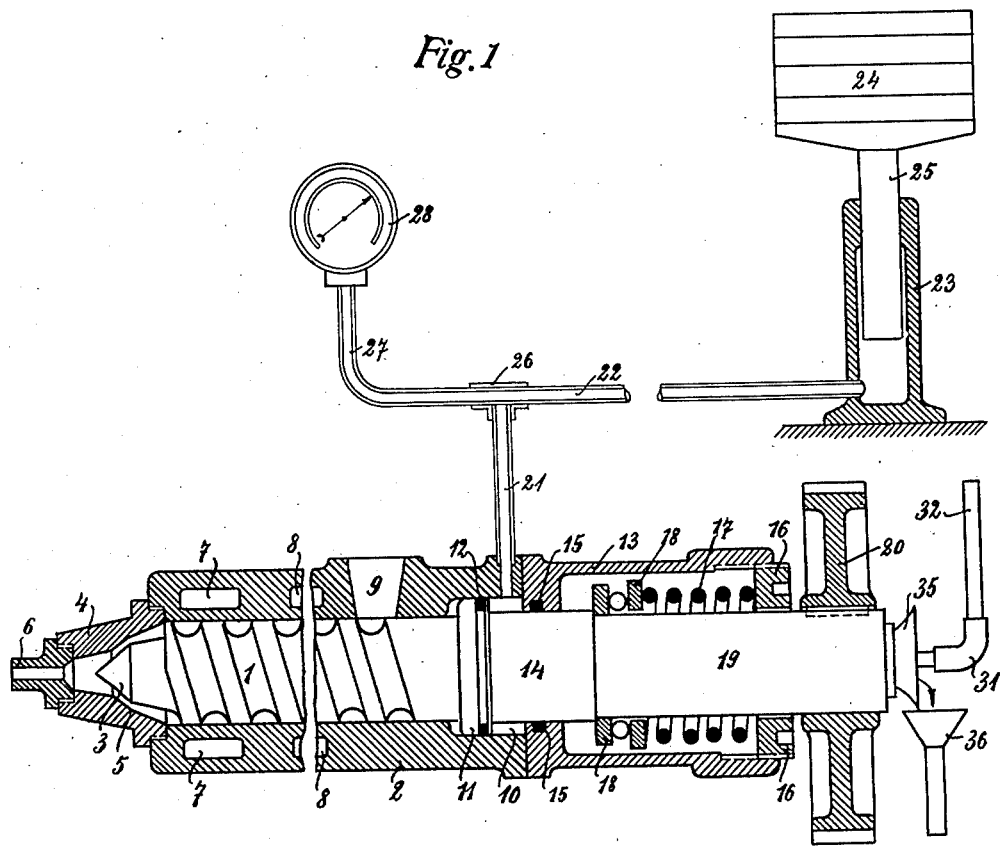

April 14, 1925.

W. KAISER ET AL

PRESS FOR PLASTIC MATERIALS

Original Filed April 27, 1923

INVENTORS
Wilhelm Kaiser
Adolph Gerdels

Patented Apr. 14, 1925.

1,533,191

UNITED STATES PATENT OFFICE.

WILHELM KAISER AND RUDOLPH GARDELS, OF HAMBURG, GERMANY, ASSIGNORS TO ADOLF BÄHR, OF HAMBURG, GERMANY.

PRESS FOR PLASTIC MATERIALS.

Application filed April 27, 1923, Serial No. 634,946. Renewed March 7, 1925.

*To all whom it may concern:*

Be it known that we, WILHELM KAISER and RUDOLPH GARDELS, citizens of the Republic of Germany, residing at Hamburg, Germany, have invented certain new and useful Improvements in Presses for Plastic Materials; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to improvements in presses used for transforming plastic materials into a plastic mass, the press being of the type in which a feed screw is used within a cylindrical casing from which the plastic material is forced by the feed screw through a mould or die and ejected in the form of a solid stream or mass.

In the manufacture of plastic masses of horn-substance or artificial horn from caseine, satisfactory results depend upon obtaining a complete homogeneous plastic mass which possesses throughout a uniform density. In order to attain this object, it is necessary that the pressure within the press used for the manufacture of such plastic mass is kept constant.

According to the present invention the maintenance of constant pressure is obtained by constructing the front end of the feed screw in conjunction with the outlet end of the cylinder or casing body to act or operate as a valve mechanism, and by setting the feed screw on the one hand under the pressure of the mass forced out and on the other hand under the combined pressure of a pressure-fluid and an adjustable pressure-spring. When owing to insufficient supply of material, non-uniform mixture of the same or the like, the pressure in the press, particularly at the delivery end of the same decreases, the feed screw being pushed forward by the combined pressure-means, throttling the exit of the material until by the advance of furthermore supplied material the pressure in the interior of the press is increased again and the desired state of balance re-established. When the pressure has become too high the adjustment takes place in a reversed manner. Thus it is rendered possible to manufacture the plastic mass by means of the press under a constant pressure and to force out a stream or mass of a uniform density.

In order to prevent an excessive warming or heating of the feed screw, the casing and its contents, the screw as well as the casing are provided with cavities through which cooling water may be passed. If required, a heating fluid such as warm water, steam or the like may be passed through the cavities for heating the press and the material contained therein.

Figure 2:
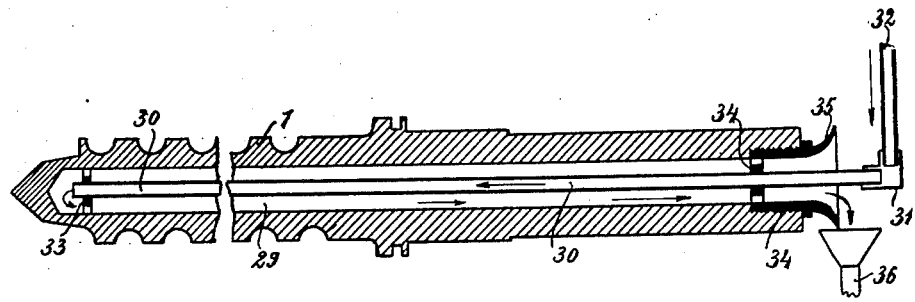

With the above ends in view the present invention consists in certain novel features of construction and combinations of parts hereinafter fully described and pointed out in the claims with reference to the accompanying sheet of drawings in which:

Fig. 1 is a longitudinal vertical section of a press constructed in accordance with and embodying the invention; and Fig. 2 a detailed similar section of the feed screw.

Similar numerals of reference designate like parts throughout the figures.

The feed screw 1 is situated in a cylindrical casing 2 and is provided at its front or delivery end with a tapering part forming a conical valve 3. To the front end of the casing 2 is secured a socket-like holder or nozzle 4 provided in its interior with a valve seat 5 for the cone 3 and carrying at its outer end a mouthpiece or die 6 the cross sectional area of which corresponds to that of the body of plastic mass to be produced. The casing 2 has in its wall preferably two cavities 7 and 8 for the reception or passage of a cooling or heating medium such as water, steam or the like, and a hopper-like opening 9 for supplying the material to be operated. The other or rear end of the bore of the casing 2 is enlarged to form a pressure chamber 10 serving at the same time as a guide for a piston like collar 11 firmly attached on the shaft portion 14 of the feed screw 1 and furnished with a piston packing ring 12 or its equivalent. To the rear end of the casing 2 beyond the pressure chamber 10, is secured a cupshaped casing section 13 having an annular recess in its portion adjacent the chamber 10, and being bored to receive the shaft portion 14 of the feed screw, the recess being provided with a packing ring 15. In the other, outer end of the casing section 13 is screwed an annular nut 16 through which the reduced portion 19 of the feed screw passes. Between the nut 16 and a thrust bearing 18, resting against the offset or shoulder between the sections 14 and 19 of the feed screw shaft, is placed a cylindrical spiral spring 17 the pressure of which may be adjusted by screwing in or out the nut 16 as required. Motion may be imparted to the feed screw by means of a gear wheel 20 (belt pulley or the like) keyed on the free extremity of the feed screw shaft section 19.

The pressure chamber 10 is in communication with the cylinder 23 of a fluid pressure accumulator by means of pipes 21 and 22 the piston 25 of the accumulator being actuated by a weight or weights 24 to force it downwardly into the cylinder 23 containing the fluid. The pressure existing in the accumulator and pressure chamber is indicated at any time by a gauge 28 connected to the pipes 21 and 22 by means of a pipe 27 and a T fitting 26.

The feed screw 1 and its shaft portions 14, 19 have a central cavity or recess 29 in which is mounted a tube 30 by means of an annular disc 33 and a bush 34 provided in axial direction with holes or passages. The pipe 30 is in communication with a supply pipe 32 by means of an elbow 31 so that any cooling or heating fluid, supplied through the pipe 32, may pass through the tube 30, flow back through the annular space between this tube and the inner wall of the central cavity or bore 29 and discharge through a delivery funnel 35 of the bush 34 into a gutter-pipe 36 or the like.

The tube 30 may either be mounted stationary within the feed screw and revolve in the elbow 31, or it may be fixed in the elbow 31 and rotate in the disc 33 and bush 34.

The function of the improved press is as follows:

The plastic material supplied through the hopper 9 is conveyed along by the feed screw 1 whereby it is kneaded and pressed under the pressure for which the press has been adjusted. The thus treated material is then forced through the annular space between the conical valve body 3 and the valve seat 5 and is finally discharged through the mouthpiece or die 6 in the form of a solid stream. The pressure by which the material is compressed depends on the size of the annular outlet orifice between the cone 3 and the seat 5. By maintaining a certain size of this orifice the material discharged through the die 6 as a stream of plastic mass, has a certain density or compression dependent on the pressure by which the mass is forced out. This pressure is adjusted and controlled in part by means of the pressure accumulator and in part by the adjustable spiral spring. The accumulator, which may be used simultaneously for a plurality of presses supplies all these presses with a uniform pressure which corresponds to the smallest pressure needed. The steps or rates of pressure required for the separate presses are determined and effected by means of the spiral spring 17 which furnishes therefore an additional adjusting pressure.

When for any reason, the pressure of the material in the annular outlet passage between the cone 3 and its seat 5 decreases, the combined effects of the pressure fluid and the adjusting spring will exceed and displace the feed screw axially to the delivery end of the casing, whereby the size of the annular outlet space is reduced. This results in an increase of the pressure in the said annular outlet space whereby the feed screw is pushed back in the opposite direction until the state of balance in pressure is re-established. The feed screw is therefore continuously oscillating in axial direction and tending to maintain the desired pressure in the annular outlet space so that the plastic mass is discharged through the die under a uniform pressure and consequently with a constant compression or density.

By adjusting the cooling water in the cavities 7 and 8, as well as in the feed screw, the temperature in the interior of the press may be controlled as required. Of special importance is the fact that the state of heat of the feed screw can be fully controlled as the temperature can be ascertained at any time by the water running down from the bush-funnel 35.

We claim:

1. A press for extruding plastic material, comprising a casing, and a feed screw rotatable therein characterized by the fact that the front end of the screw in conjunction with the feed screw casing is constructed to form a valve mechanism, and that the feed screw forces the plastic mass out under the combined pressure of a pressure fluid and an adjustable pressure spring.

2. A press according to claim 1 characterized by a feed screw having an inner cavity supplied by inlet and outlet pipe conduits with a medium for cooling or heating the said feed screw.

3. A press according to claim 1 characterized by a feed screw provided with a central bore extending nearly to its front end and having mounted therein an annular disc and a bush serving as supports for a central tube inserted into bore, the said disc and bush having holes for the passage of a temperature modifying fluid supplied through the tube into the bore of the feed screw.

In testimony that we claim the foregoing as our invention, we have signed our names.

WILHELM KAISER.
RUDOLPH GARDELS.